(12) United States Patent
Criel et al.

(10) Patent No.: US 9,308,814 B2
(45) Date of Patent: Apr. 12, 2016

(54) METHOD OF CONTROLLING THE PRESSURE OF A FUEL SYSTEM OF A HYBRID VEHICLE

(75) Inventors: Bjorn Criel, Sint-Martens-Lennik (BE); Jean-Francois Berard, Boulogne Billancourt (FR)

(73) Assignee: INERGY AUTOMOTIVE SYSTEMS RESEARCH (Societe Anonyme), Brussels (BE)

( * ) Notice: Subject to any disclaimer, the term of this patent is extended or adjusted under 35 U.S.C. 154(b) by 6 days.

(21) Appl. No.: 14/240,831

(22) PCT Filed: Aug. 23, 2012

(86) PCT No.: PCT/EP2012/066384
§ 371 (c)(1),
(2), (4) Date: Mar. 19, 2014

(87) PCT Pub. No.: WO2013/026895
PCT Pub. Date: Feb. 28, 2013

(65) Prior Publication Data
US 2014/0217109 A1   Aug. 7, 2014

(30) Foreign Application Priority Data
Aug. 25, 2011   (EP) .................................. 11178877

(51) Int. Cl.
| | |
|---|---|
| *B60K 15/035* | (2006.01) |
| *B60K 15/03* | (2006.01) |
| *F02M 25/08* | (2006.01) |
| *F02D 29/02* | (2006.01) |
| *F02D 41/00* | (2006.01) |
| *B60K 6/20* | (2007.10) |

(52) U.S. Cl.
CPC ......... *B60K 15/035* (2013.01); *B60K 15/03177* (2013.01); *B60K 15/03519* (2013.01); *F02D 29/02* (2013.01); *F02M 25/08* (2013.01); *B60K 6/20* (2013.01); *B60K 2015/03561* (2013.01); *B60K 2015/03585* (2013.01); *B60Y 2200/92* (2013.01); *F02D 41/003* (2013.01)

(58) Field of Classification Search
CPC .................. B60K 15/035; B60K 2015/03561; B60K 2015/03585; B60K 15/03177
See application file for complete search history.

(56) References Cited

U.S. PATENT DOCUMENTS

| | | | |
|---|---|---|---|
| 5,601,065 A * | 2/1997 | Tamura et al. ................. | 123/516 |
| 2003/0098062 A1 | 5/2003 | Engle et al. | |
| 2007/0012298 A1 | 1/2007 | Nakamura et al. | |
| 2008/0302341 A1 | 12/2008 | Reddy | |
| 2009/0057945 A1 * | 3/2009 | Tardy et al. ................. | 264/209.3 |
| 2009/0206097 A1 * | 8/2009 | Gebert et al. ................. | 220/653 |
| 2011/0166765 A1 | 7/2011 | Debastos et al. | |
| 2011/0290000 A1 | 12/2011 | Debastos et al. | |

FOREIGN PATENT DOCUMENTS

| | | |
|---|---|---|
| CN | 1272083 A | 11/2000 |
| CN | 1854484 A | 11/2006 |
| WO | 2009 103404 | 8/2009 |
| WO | 2010 094369 | 8/2010 |
| WO | 2011 094704 | 8/2011 |

OTHER PUBLICATIONS

International Search Report Issued Nov. 27, 2012 in PCT/EP12/066384 Filed Aug. 23, 2012.

* cited by examiner

*Primary Examiner* — Lindsay Low
*Assistant Examiner* — Jacob Amick
(74) *Attorney, Agent, or Firm* — Oblon, McClelland, Maier & Neustadt, L.L.P.

(57) ABSTRACT

A method of controlling pressure of a fuel system of a hybrid vehicle including an engine fed with fuel stored in a tank made of plastics material, and an electric motor, the method including, when the engine is stopped, relaxing pressure inside the fuel tank in full or in part after a given safety duration and as a function of at least one stress accumulation parameter, each stress accumulation parameter being associated with an element of the fuel system and being defined by information concerning temperature, information concerning exposure duration, and information concerning a level of stress on the element.

7 Claims, No Drawings

METHOD OF CONTROLLING THE PRESSURE OF A FUEL SYSTEM OF A HYBRID VEHICLE

FIELD OF THE INVENTION

The present invention relates to a method of controlling the pressure of a fuel system of a hybrid vehicle.

The term "hybrid vehicle" is generally used for a vehicle that associates the use of a fuel-burning engine and an electric motor.

BACKGROUND OF THE INVENTION

A general principle for operating hybrid vehicles consists in operating either the electric motor, or the engine, or else both at the same time, depending on the model.

One of the main features is as follows:
- during stationary stages (when the vehicle is not moving), both the engine and the motor are stopped;
- on starting, it is the electric motor that serves to put the car into motion, up to higher speeds (25 kilometers per hour (km/h) or 30 km/h);
- when higher speeds are reached, the engine takes over;
- in the event of high acceleration, both the engine and the motor are operated together, thereby making acceleration possible that is equivalent to that of an engine of the same power, or even greater; and
- during a deceleration and braking stage, kinetic energy is used to recharge the batteries (it should be observed that this feature is not available on all hybrid vehicles available on the market at present).

It can be seen that the engine does not operate continuously, and that under such circumstances, it is not possible to perform stages of purging the canister (an active carbon filter that avoids dumping fuel vapor into the atmosphere), because during such stages, optionally pre-heated air is caused to flow through the canister in order to regenerate it (i.e. in order to desorb the fuel vapor that has been adsorbed therein), with that air then being admitted into the engine where it is burnt.

Under such circumstances, in order to avoid loading the canister pointlessly, communication between the tank and the canister is generally interrupted by default; as a result, the fuel tanks of such vehicles are generally put under pressure (typically a pressure of the order of 300 millibars (mbar) to 400 mbar), with this generally being done by a functional element that is situated after the ventilation valves, often referred to as a fuel tank isolation valve (FTIV) and that prevents the tank being ventilated (degassing) other than during filling situations. This element generally comprises two safety valves (calibrated to the low and high maximum pressures at which the tank can be used) together with control means, generally electrical control means, in order to be able to bring the tank to atmospheric pressure before filling.

Compared with their metal counterparts, tanks (or other portions of the fuel system) that are made of plastics material present certain advantages in terms of weight and ease of preparation. Nevertheless, they can give rise to problems on being subjected to positive and/or negative pressure exceeding the above-mentioned "threshold" values, in the event of being subjected thereto for a prolonged duration. It can thus happen that there is cracking under stress, which can be made worse by exposure to the fuel, temperature, . . . .

It is possible to distinguish several types of cracking:
- cracking of the skin of the tank;
- cracking of reinforcing elements added inside the tank to limit deformation thereof during periods in which it is subjected to internal positive or negative pressure; and
- cracking on some other element of the system.

OBJECT OF THE INVENTION

The present invention seeks to solve this problem by proposing a strategy/method for controlling a fuel system of a hybrid vehicle that makes it possible to use parts made of plastics material with increased safety.

The invention is based on the idea of temporarily releasing the pressure in a fuel tank (FT) other than during filling situations in order to relieve the plastics material. The Applicant has observed that such temporary depressurization, which may be complete, ends up loading the canister only very little, typically only about 20% compared with a filling situation.

SUMMARY OF THE INVENTION

Under such circumstances, the present invention provides method of controlling the pressure of a fuel system of a hybrid vehicle having both an engine fed with fuel stored in a tank made of plastics material and an electric motor, in which method, when the engine is stopped, the pressure inside the fuel tank is relaxed in full or in part after a given safety duration and as a function of at least one stress accumulation parameter, each stress accumulation parameter being associated with an element of the fuel system and being defined by information concerning temperature, information concerning duration of exposure, and information concerning a level of stress on said element.

MORE DETAILED DESCRIPTION

The fuel to which the invention applies may be gasoline, diesel, biofuel, . . . and it may have an alcohol content lying in the range 0% to 100%.

In the present specification, the fuel system is an assembly of elements for associating with the fuel-burning engine of a hybrid vehicle. These elements generally comprise devices associated with storing fuel (tanks, ventilation device, canister, . . . ) and devices associated with feeding fuel to the engine.

The elements of the fuel system of the invention are made of a material that is compatible with each of the liquid hydrocarbons that might be involved. The material must be chemically inert both relative to volatile liquid hydrocarbons and to heavy liquid hydrocarbons, and at the usual utilization pressures and temperatures. It may be a plastics material or a metal. The elements of the system of the invention may also be mixed, i.e. they may comprise parts made of metal and parts made of plastics material. According to the invention, at least the fuel tank is made of a plastics material, i.e. comprises an enclosure made of plastics material defining a storage volume. The enclosure is preferably reinforced, e.g. by internal or external fiber reinforcement, by local bonds (kiss points), by a fitted reinforcing element (a kind of pillar) connecting together its bottom and top walls, . . . .

Thermoplastics materials give good results in the context of the invention, in particular because of their advantages in terms of weight, mechanical strength, chemical resistance, and ease of preparation, in particular when the elements of the system present shapes that are complex.

In particular, it is possible to use polyolefins, thermoplastic polyesters, polyketones, polyamides, and copolymers thereof. A mixture of polymers or of copolymers may also be used, as may a mixture of polymer materials with fillers that may be inorganic, organic, and/or natural, such as, by way of non-limiting example: carbon; salts and other inorganic derivatives; natural or polymer fibers. It is also possible to use multilayer structures made up of stacked layers that are bonded together and that comprise at least one of the above-described polymers or copolymers.

A polymer that may be used for fuel tanks is polyethylene. Excellent results have been obtained with high density polyethylene (HDPE).

The tank to which the method of the invention is applied preferably presents a multilayer structure having at least one layer of thermoplastics material and at least one additional layer that may advantageously be constituted by a material constituting a barrier to liquids and/or gases.

The present invention is entirely applicable to fuel tanks made of HDPE having a barrier layer of ethylene-vinyl-alcohol copolymer (EVOH).

The method of the invention seeks to avoid putting the tank under pressure for a prolonged duration when the engine is stopped, i.e. generally while the vehicle is operating in electric mode or while the vehicle is parked.

To do this, the method of the invention provides for relaxing the pressure inside the fuel tank in full or in part after a given safety period.

In general, this relaxing of pressure is performed by a ventilation device. The term "ventilation device" is used to designate one or more interconnected hollow elements suitable for being inserted in a ventilation circuit of a fuel system and for passing fuel vapor generally going from the tank towards a canister. The device is generally a valve. The valve is preferably an FTIV as described above.

The term "canister" is generally used to designate an enclosure containing a substance that adsorbs fuel vapor, usually activated charcoal. The role of the canister is to avoid releasing fuel vapor into the atmosphere. The enclosure has an inlet through which vapor from the fuel tank penetrates, and an outlet through which air from which fuel vapor has been purified can escape. It should be observed that when the tank is at negative pressure, atmospheric air flows from the outlet of the canister towards its inlet.

The term "connected" is generally used herein to designate being fastened directly on or connected to via a connection line. In general, connections take place via lines.

The method of the invention is generally applied to the fuel system by a processor, which may be incorporated in the on-board computer of the vehicle (also known as the engine control unit (ECU)), or by a processor that is specific to the fuel system (sometimes referred to as a fuel system control unit (FSCU)).

In this variant of the invention, either the safety period is constant and stored in a memory of the ECU and/or of the FSCU, or else it is defined (deduced) thereby as a function of values read by sensors, e.g. for sensing pressure and/or temperature. This latter variant is preferred. In particular, the safety period may be defined by the processor depending on a temperature value read by a sensor. Typically, this duration may be infinite when the temperature is less than a threshold value (e.g. 50° C.), typically lying in the range 50 hours (h) to 1000 h when the temperature lies in the range 50° C. to 60° C., and typically lies in the range 0 h to 100 h when the temperature exceeds 60° C.

In the invention, at the end of the safety period, the pressure is either released in full (the tank then being put to atmospheric pressure), or else it is lowered to below a predetermined value. In other words, it is lowered to a threshold pressure that may be atmospheric pressure or a given positive pressure.

This threshold pressure is preferably calculated on the basis of accumulated stress in the elements of the system. This accumulation may be expressed on the basis of an accumulation parameter incorporating the following data:
temperature;
duration of exposure; and
stress levels in the reinforcing elements, having a direct link with the internal pressure inside the tank (a parameter that can be measured by a pressure sensor) and for which the link with stress can be determined using tables stored in a processor as described above.

The accumulation parameter may be applied to:
the skin of the tank (of shape that may vary);
the reinforcing elements inside the tank; and
any other elements made of plastics material and subjected to pressure (ventilation lines, canister, . . . ); it being understood that the final value of the threshold pressure preferably takes account of stress accumulation parameters for all of the elements of the system (skin, reinforcement, any other element).

By way of example, stress accumulation may take place when the vehicle is running in a location that is hot, for example Death Valley in the United States. Assuming that operations of filling the tank with fuel took place in the morning and that the vehicle is running in Death Valley in the middle of the day, i.e. at the time when the temperature is very high (e.g. higher than 50° C.), the internal pressure inside the tank can rapidly reach a maximum authorized pressure level. The internal pressure inside the tank may remain at this maximized authorized level (or possibly at higher level) for an extended duration. Thus, in order to avoid any risk of cracking in the elements of the fuel system, and in particular elements of the tank, the pressure inside the tank is relaxed in full or in part, e.g. after running for one hour at the maximized authorized pressure level (or at a higher level). While the vehicle is running, it may be propelled by using the fuel-burning engine or the electric motor.

The invention claimed is:

1. A method of controlling pressure of a fuel system of a hybrid vehicle including both an engine fed with fuel stored in a tank made of plastics material and an electric motor, the method comprising:
when the engine is stopped, relaxing pressure inside the fuel tank in full or in part after a given safety duration and as a function of at least one stress accumulation parameter, each of the at least one stress accumulation parameter being associated with an element of the fuel system and being defined by information concerning temperature, information concerning duration of exposure of the plastics material of the tank to the fuel, and information concerning a level of stress on the element.

2. A method according to claim 1, wherein the tank includes an enclosure made of plastics material defining a storage volume, the enclosure being reinforced, or reinforced by internal or external fiber reinforcement, or by local bonds, or by a fitted reinforcing element that connects together its bottom and top walls.

3. A method according to claim 1, wherein the tank is made of high density polyethylene (HDPE) and includes a barrier layer made of ethylene-vinyl-alcohol copolymer (EVOH).

4. A method according to claim 1, wherein pressure is relaxed by a valve.

5. A method according to claim 4, wherein the valve is a fuel tank isolation valve (FTIV).

6. A method according to claim 4, the method being applied to the fuel system by a processor that may be incorporated in an on-board computer of the vehicle, or by a processor that is specific to the fuel system.

7. A method according to claim 6, wherein the safety duration is defined by the processor depending on a temperature value read by a sensor.

* * * * *